Dec. 18, 1951     S. MITTLEBURG     2,579,392
DISPOSABLE CART FORMED FROM WIRE
Filed Aug. 19, 1948
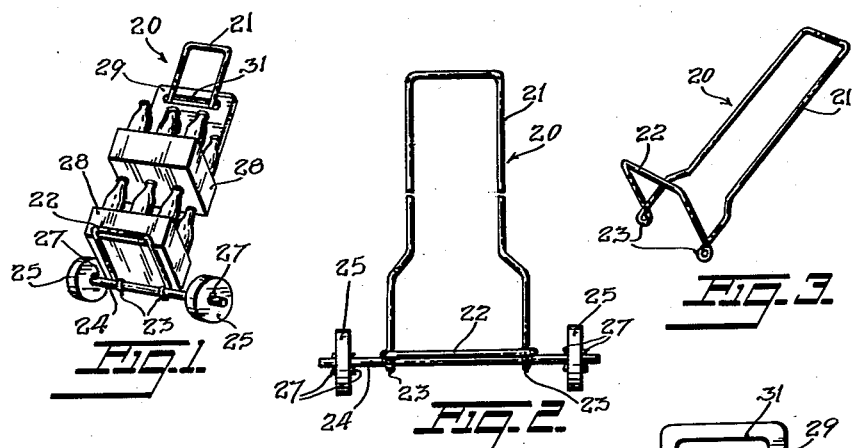
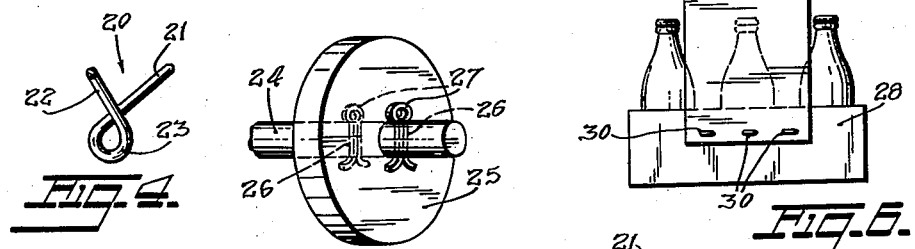
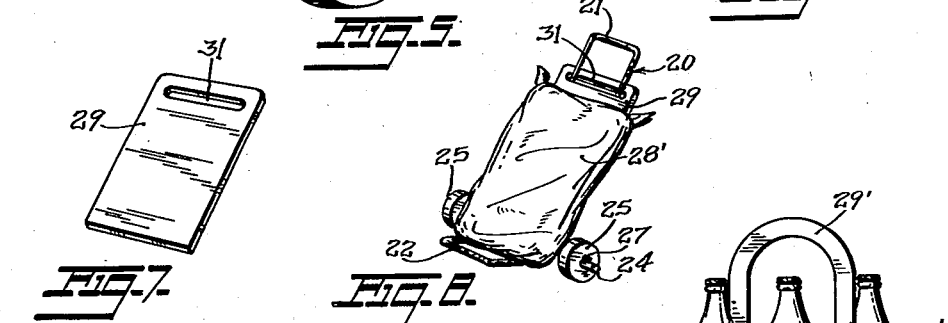
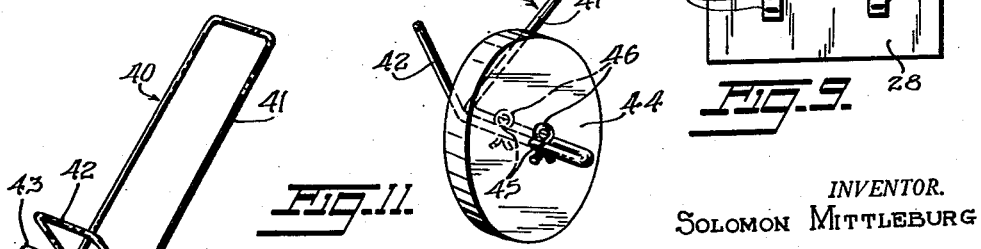
INVENTOR.
SOLOMON MITTLEBURG
BY
ATTORNEY Patented Dec. 18, 1951

2,579,392

UNITED STATES PATENT OFFICE 2,579,392

DISPOSABLE CART FORMED FROM WIRE

Solomon Mittleburg, Kew Gardens, N. Y.

Application August 19, 1948, Serial No. 45,063

2 Claims. (Cl. 280—53)

This invention relates to new and useful improvements in a cart for transporting sectioned bottle boxes, bags, cartons and other similar containers.

More particularly, the present invention relates to an inexpensive wheeled cart upon which packaged merchandise may be shipped as a unit with the merchandise to the forwarding address in a manner to facilitate quick handling of the merchandise during transportation to the point of delivery.

Still further, the invention proposes that the cart be constructed of relatively stiff inexpensive wire bent to include an upstanding handle portion which continues at its bottom into a base portion continuing at right angles from the handle portion in a manner so that the merchandise to be transported may be stacked upon the base portion along side of the handle portion.

It is a further object of the present invention to form the cart with loop portions at the junction of the handle portion and the base portion through which an axle may be passed in a manner to have wheels engaged upon the ends thereof outwardly of the sides of the cart.

Another object of the present invention proposes forming the junction of the handle portion with the base portion with outwardly extending axle portions arranged in axial alignment in a manner to have wheels rotatively mounted thereon.

Still another object of the present invention proposes the provision of a novel handle arranged to have one end securely attached to the side of the merchandise to be transported on the cart, and a slat at its other end through which the handle portion of the cart is adapted to be extended in a manner to retain the merchandise in position on the cart.

The present invention further proposes forming the handle of a length of flexible material which has its ends attached to the sides of the merchandise in a manner to form a loop through which the handle portion of the cart may be projected.

A further object of the present invention proposes the construction of a novel merchandise transporting cart which may be shipped in a collapsed condition and which may be quickly and easily assembled by the prospective user in a minimum of time and with the aid of a minimum number of tools.

It is a further object of the present invention to construct a package transporting cart and package attaching means which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a package transporting cart constructed in accordance with the present invention and having a pair of sectioned bottle boxes stacked thereon and retained in position by means of handles constructed in accordance with this invention.

Fig. 2 is a front elevational view of the transporting cart, per se.

Fig. 3 is a perspective view of the frame of the cart, per se.

Fig. 4 is an enlarged detailed view of a portion of Fig. 3.

Fig. 5 is an enlarged detailed view of a portion of Fig. 1.

Fig. 6 is a rear elevational view of one of the sectioned bottle boxes showing the handle attached thereto.

Fig. 7 is a perspective view of the handle, per se.

Fig. 8 is a perspective view similar to Fig. 1, but illustrating a modification of the invention.

Fig. 9 is a rear elevational view of a sectioned bottle box similar to Fig. 6, but illustrating still another modification of the invention.

Fig. 10 is a perspective view similar to Fig. 3, but illustrating the cart frame constructed in accordance with still another modification of the present invention.

Fig. 11 is an enlarged perspective view of a portion of Fig. 10 and illustrating one of the wheels mounted in position thereon.

The improved cart and package retaining means, in accordance with the present invention, includes a frame 20 formed of a continuous length of relatively stiff wire bent to include a handle portion 21 and a base portion 22 extending at right angles from one side of the bottom of the handle portion 21.

At the junction of the handle portion 21 and the base portion 22, the cart is formed with a pair of spaced concentric loop portions 23 through which the intermediate portion of an axle 24 is slidably engaged. The loop portions 23 are somewhat smaller in diameter than the diameter of the axle 24 so that the axle must be forced through the loop portions 23 causing the loop portions 23 to grip the axle 24 and securely hold the same against sidewise displacement.

Rotatively engaged upon the ends of the axle 24 outwardly of the sides of the frame 20, are wheels 25. Each end of the axle 24 is formed with a pair of holes 26 extended diametrically therethrough. Cotter pins or similar holding elements are adapted to be passed through the holes 26 for rotatively retaining the wheels 25 in position upon the ends of the shaft 24. The holes 26 are spaced a distance slightly greater than the thickness of the material from which the wheels 25 are formed so as not to interfere with a free rotation of the wheels when pushing or pulling the cart. The wheels 25 may be formed of wood, fiber material, resinous plastic material or any other similar material.

It will be apparent that a simple merchandise cart has been provided which may be shipped in a disassembled condition and which may be quickly and easily assembled with the aid of only a pair of pliers or similar tool for bending the ends of the cotter pins 27 to secure the wheels 25 in position on the ends of the axle 24.

As shown in Fig. 1, by way of example, a plurality of sectioned bottle boxes 28 may be stacked on the cart with the boxes resting on the base portion 22 and extending vertically along side of the handle portion 21 to facilitate quick and easy movement of the bottle boxes 28 while being carried from one place to the other.

Means is provided on one of the sides of bottle boxes 28 for quick and easy attachment to the handle portion 21 of the frame 20 of the cart for securely retaining the bottle boxes 28 in position upon the cart.

The retaining means comprises a handle 29 for each of the bottle boxes 28. These handles 29 are preferably formed of cardboard and have their lower ends securely attached to the sides of the bottle boxes 28 by means of the usual U-shaped staples 30. The top end of the handles 29 project above the top edges of the boxes 28 and above the tops of the bottles in the boxes and are provided with slots 31 of a length slightly greater than the width of the handle portion 21 of the frame 20 of the cart. As shown in Fig. 1, the top end of the handle portion 21 of the frame 20 has been passed through the slots 31 of the handles 29 to retain the bottle boxes 28 securely in a stacked position upon the frame 20 of the cart.

It is apparent that when the cart and boxes are assembled as shown in Fig. 1, the cart may be conveniently rolled from place to place without fear of the boxes falling off the cart.

In Fig. 8 the cart constructed in accordance with the present invention is shown in use transporting a sack 28' of potatoes, flour or other similar dry materials. The handle 29 is secured to one side of the sack 28' and has the top end of the handle portion 21 of the cart passed through its slot 31.

In the modification of the invention shown in Fig. 9, there is illustrated a different form of handle 29' for attachment to the side of the bottle boxes 28 or similar merchandise to be transported on the cart of the present invention. In this modification of the invention, the handle 29' is formed of a length of flexible cardboard or other similar material of inverted U-shaped configuration and having the lower ends of its side arms securely attached to the sides of the bottle box 28 by means of staples 30' to form a loop through which the handle portion 21 of the frame of the cart may be passed.

In Figs. 10 and 11 a modified frame 40 for the cart is illustrated. The frame 40 is formed of a continuous piece of relatively stiff wire and includes a handle portion 41 and a base portion 42 which extends at right angles from one side of the bottom of the handle portion 41.

The junctions of the handle portion 41 and the base portion 42 at the sides of the frame 40 continue into axially aligned laterally extending shaft portions 43 each composed of adjacent lengths of wire bent into intimate facial contact with one another. As shown in Fig. 11, a wheel 44 is adapted to be slipped over the outer end of each of the shaft portions 43. Each of the shaft portions 43 is formed with spaced holes 45, see Fig. 10. Cotter pins 46 are passed through the holes 45 and have their ends bent apart to rotatively retain the wheels 44 in position upon the shaft portions 43. The holes 46 are spaced apart a distance slightly greater than the thickness of the wheels 44 so that the cotter pins 46 will not interfere with free rotation of the wheels 44 upon the shaft portions 43.

In other respects, the manner of using the cart shown in Figs. 9 and 10 is similar to that described in connection with the form of the invention illustrated in Figs. 1 to 7.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a cart, centrally apertured wheels, a continuous loop of stiff wire bent to have an inverted U-shaped handle portion and at the bottom thereof a right angularly extended U-shaped base portion, and means rotatatively mounting said centrally apertured wheels, said mounting means comprising axially aligned laterally extending shaft portions continuing outwardly from the junctions of the side arms of the handle portion and the base portion, said shaft portions comprising adjacent lengths of wire bent into intimate facial contact with each other to have their free ends passed through the apertures of the wheels, and means retaining the wheels rotatively in position on said shaft portions midway of the lengths of said shaft portions.

2. In a cart, centrally apertured wheels, a continuous loop of stiff wire bent to have an inverted U-shaped handle portion and at the bottom thereof a right angularly extended U-shaped base portion, and means rotatatively mounting said centrally apertured wheels, said mounting means comprising axially aligned laterally extending shaft portions continuing outwardly from the junctions of the side arms of the handle portion and the base portion, said shaft portions comprising adjacent lengths of wire bent into intimate facial contact with each other to have their free ends passed through the apertures of the wheels, and means retaining the wheels rotatively in position on said shaft portions midway of the lengths of said shaft portions, said retaining means comprising cotter pins on opposite sides of each of the wheels, holes formed in the adjacent faces of the adjacent lengths of wire of each of said shaft portions and on opposite sides of the wheels and through which said cotter pins are engaged.

SOLOMON MITTLEBURG.

REFERENCES CITED

The following references are of record in the file of this patent:

UNITED STATES PATENTS

| Number | Name | Date |
|---|---|---|
| 394,443 | Berger | Dec. 11, 1888 |
| 1,532,339 | Parke | Apr. 7, 1925 |
| 2,070,986 | Foss | Feb. 16, 1937 |
| 2,434,140 | Bernstein | Jan. 6, 1948 |

FOREIGN PATENTS

| Number | Country | Date |
|---|---|---|
| 21,933 | Sweden | July 31, 1906 |
| 777,422 | France | Aug. 17, 1934 |
| 857,678 | France | Sept. 24, 1940 |